United States Patent
Brooker et al.

(10) Patent No.: US 12,320,276 B2
(45) Date of Patent: *Jun. 3, 2025

(54) HYDROGEN AND OXYGEN SUPPLEMENTAL FIRING FOR COMBINED-CYCLE FACILITY

(71) Applicant: Mitsubishi Power Americas, Inc., Lake Mary, FL (US)

(72) Inventors: Craig Satoshi Brooker, Winter Springs, FL (US); Song Wu, Livingston, NJ (US); Michael McManus, Palm Coast, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,344

(22) Filed: Apr. 11, 2023

(65) Prior Publication Data

US 2023/0250737 A1 Aug. 10, 2023

Related U.S. Application Data

(63) Continuation of application No. 16/777,207, filed on Jan. 30, 2020, now Pat. No. 11,661,866.

(51) Int. Cl.
*F01K 23/10* (2006.01)
*F01K 23/06* (2006.01)
(Continued)

(52) U.S. Cl.
CPC ............ *F01K 23/103* (2013.01); *F01K 23/06* (2013.01); *F01K 23/105* (2013.01);
(Continued)

(58) Field of Classification Search
CPC ........ F01K 23/06; F01K 23/10; F01K 23/103; F01K 23/105
See application file for complete search history.

(56) References Cited

U.S. PATENT DOCUMENTS 3,608,660 A 9/1971 Smith et al.
3,732,059 A 5/1973 Goodnight et al.
(Continued)

FOREIGN PATENT DOCUMENTS

CA 2525189 5/2006
CN 1112662 11/1995
(Continued)

OTHER PUBLICATIONS

"Chinese Application Serial No. 202110137809.9, Voluntary Amendment mailed Jun. 21, 2023", With English Machine Translation, 17 pgs.
(Continued)

*Primary Examiner* — Scott J Walthour
(74) *Attorney, Agent, or Firm* — Schwegman Lundberg & Woessner, P.A.

(57) ABSTRACT

A combined-cycle power plant comprises a gas turbine engine for generating exhaust gas, an electric generator driven by the gas turbine engine, a steam generator receiving the exhaust gas to heat water and generate steam, and a duct burner system configured to heat exhaust gas in the steam generator before generating the steam and that comprises a source of hydrogen fuel, a fuel distribution manifold to distribute the hydrogen fuel in a duct of the steam generator, and an igniter to initiate combustion of the hydrogen fuel in the exhaust gas. A method for heating exhaust gas in a steam generator for a combined-cycle power plant comprises directing combustion gas of a gas turbine engine into a duct, introducing hydrogen fuel into the duct, combusting the hydrogen fuel and the combustion gas to generate heated gas, and heating water in the duct with the heated gas to generate steam.

19 Claims, 4 Drawing Sheets

(51) Int. Cl.
   *F01K 25/00* (2006.01)
   *F23D 14/10* (2006.01)
   *F23D 14/22* (2006.01)
   *F23R 3/20* (2006.01)
   *F02C 7/22* (2006.01)

(52) U.S. Cl.
   CPC ............ *F01K 25/005* (2013.01); *F23D 14/10* (2013.01); *F23D 14/22* (2013.01); *F23R 3/20* (2013.01); *F02C 7/222* (2013.01); *F23C 2900/9901* (2013.01); *F23R 2900/00002* (2013.01)

(56) References Cited

U.S. PATENT DOCUMENTS

| | | | |
|---|---|---|---|
| 3,942,945 | A | 3/1976 | Delaplace et al. |
| 4,036,011 | A * | 7/1977 | Gupta ................... F01K 23/105 137/599.08 |
| 6,247,315 | B1 | 6/2001 | Marin et al. |
| 6,263,568 | B1 | 7/2001 | Bannister et al. |
| 7,272,934 | B2 | 9/2007 | Chandran et al. |
| 8,281,590 | B2 | 10/2012 | Hinders et al. |
| 10,026,974 | B2 | 7/2018 | Tatsui et al. |
| 11,661,866 | B2 * | 5/2023 | Brooker ................. F23D 14/22 60/39.182 |
| 2007/0062175 | A1 | 3/2007 | Yuan et al. |
| 2008/0145805 | A1 | 6/2008 | Towler et al. |
| 2010/0045034 | A1 * | 2/2010 | Hinders ................. F28F 19/02 290/52 |
| 2010/0083666 | A1 | 4/2010 | Brook et al. |
| 2011/0154950 | A1 * | 6/2011 | Cao ..................... F27D 99/0033 75/673 |
| 2012/0260667 | A1 | 10/2012 | Chillar et al. |
| 2012/0312018 | A1 | 12/2012 | Anderson |
| 2013/0255272 | A1 | 10/2013 | Ajhar et al. |
| 2014/0130476 | A1 | 5/2014 | Nakamura et al. |
| 2016/0238240 | A1 | 8/2016 | Colannino et al. |
| 2018/0128172 | A1 | 5/2018 | Allam |
| 2021/0239015 | A1 | 8/2021 | Brooker et al. |

FOREIGN PATENT DOCUMENTS

| | | |
|---|---|---|
| CN | 1408996 | 4/2003 |
| CN | 1414294 | 4/2003 |
| CN | 101503976 | 8/2009 |
| CN | 105229278 | 1/2016 |
| CN | 113266848 A | 8/2021 |
| DE | 3310984 | 11/1983 |
| DE | 102021100871 A1 | 8/2021 |
| GB | 761167 | 11/1956 |
| JP | 2002061517 | 2/2002 |
| JP | 2002139210 | 5/2002 |
| JP | 2002257345 | 9/2002 |
| JP | 2004156827 | 6/2004 |
| JP | 2016510379 | 4/2016 |
| JP | 6109577 B2 | 3/2017 |
| JP | 2018096616 A | 6/2018 |
| WO | 2012121390 | 9/2012 |
| WO | 2014117040 | 7/2014 |
| WO | 2017123755 | 7/2017 |

OTHER PUBLICATIONS

"U.S. Appl. No. 16/777,207, Final Office Action mailed Nov. 18, 2022", 15 pgs.

"U.S. Appl. No. 16/777,207, Non Final Office Action mailed Dec. 24, 2021", 19 pgs.

"U.S. Appl. No. 16/777,207, Notice of Allowability mailed Mar. 7, 2023", 7 pgs.

"U.S. Appl. No. 16/777,207, Notice of Allowance mailed Feb. 7, 2023", 18 pgs.

"U.S. Appl. No. 16/777,207, Response filed Mar. 24, 2022 to Non Final Office Action mailed Dec. 24, 2021", 16 pgs.

"U.S. Appl. No. 16/777,207, Response filed Aug. 2, 2022 to Restriction Requirement mailed Jul. 11, 2022", 7 pgs.

"U.S. Appl. No. 16/777,207, Response filed Dec. 21, 2022 to Final Office Action mailed Nov. 18, 2022", 13 pgs.

"U.S. Appl. No. 16/777,207, Restriction Requirement mailed Jul. 11, 2022", 7 pgs.

"Chinese Application Serial No. 202110137809.9, Response filed Nov. 20, 2024 to Office Action mailed Jul. 31, 2024", with English claims, 26 pages.

"Japanese Application Serial No. 2021-013074, Notification of Reasons for Refusal mailed Nov. 16, 2024", with English translation, 11 pages.

"Chinese Application Serial No. 202110137809.9, Office Action mailed Jul. 31, 2024", with English translation, 14 pages.

* cited by examiner

HYDROGEN AND OXYGEN SUPPLEMENTAL FIRING FOR COMBINED-CYCLE FACILITY

PRIORITY APPLICATIONS

This is a continuation application of U.S. patent application Ser. No. 16/777,207, filed Jan. 30, 2020, the content of which is incorporated herein by reference in its entirety.

TECHNICAL FIELD

This document pertains generally, but not by way of limitation, to combined-cycle power plants, such as those including gas turbine engines. More specifically, but not by way of limitation, the present application relates to supplemental firing systems for combined-cycle power plants, such as those that can be used in heat recovery steam generators.

BACKGROUND

In a gas turbine combined-cycle (GTCC) power plant, a gas turbine engine can be operated to directly generate electricity with a generator using shaft power. Hot exhaust gas of the gas turbine engine can additionally be used to generate steam within a heat recovery steam generator (HRSG) that can be used to rotate a steam turbine shaft to further produce electricity.

Output of the HRSG can be increased by increasing the temperature of the exhaust gas, such as by use of a supplemental firing system. In such systems, a natural gas fuel can be directed into the duct of the HRSG and ignited via a duct burner to increase the energy and temperature of the exhaust gas, thereby increasing the capability of producing steam in the HRSG.

Examples of combined-cycle power plants using supplemental firing systems or duct burners are described in U.S. Pat. No. 6,810,675 to Liebig; U.S. Pat. No. 6,606,848 to Rollins III; and Pub. No. US 2017/0350279 to Kobayashi et al.

OVERVIEW

Problems to be solved in operating combined-cycle power plants include the emission of carbon dioxide ($CO_2$) due to burning of fossil fuels such as natural gas, which is the most widely used fossil fuel for power generation in the United States. The power industry is attempting to move towards reduced-carbon or carbon-free electricity in response to various state policies prompting the drawing down of carbon-based power along with the additional eventual transition to 100% renewable energy. However, the present inventors have recognized, among other things, that combined-cycle power plants utilize fossil fuels in multiple, disparate places within a gas turbine combined-cycle power plant. As such, simply transitioning a gas turbine engine of a combined-cycle power plant over to burning cleaner fuel will not achieve the lowest emissions possible.

The present subject matter can provide solutions to this problem and other problems, such as by providing methods and systems for providing carbon-free fuel to a combined-cycle power plant. One portion of the combined-cycle facility that uses fuel, in addition to the gas turbine (GT), to support the production of electricity is the duct burner that is located within the HRSG. The duct burner inside of the HRSG provides supplemental heat input to the thermal cycle to provide the capability to increase steam production that can be converted to electrical energy via a steam turbine generator (STG). The duct burner typically uses natural gas as the fuel.

The present inventors have recognized that duct burners have the ability to burn a wide range of fuels. One source of carbon-free electricity is via the use of hydrogen. One such power generation facility that can convert hydrogen to electricity is a combined-cycle power plant having a duct burner with a fuel source that is at least partially hydrogen. Regardless of the percentage of hydrogen burned, it will produce lower $CO_2$ emissions than that of combusting 100% natural gas. Furthermore, the present disclosure can use a source of pressurized hydrogen fuel, such as an electrolyser, at the location of the GTCC power plant. Furthermore, a source of pressurized oxygen, such as the electrolyser, can additionally be located at the GTCC power plant to provide an oxidant to the combustion process. The amount of hydrogen and oxygen can be controlled or modulated, such as by using a burner management system, to control the supplemental firing combustion process independent of the operation of the GT, thereby allowing tailored steam production in the HRSG.

In an example, a duct burner system for a combined-cycle power plant comprising a gas turbine engine configured to generate exhaust gas and a steam generator configured to receive the exhaust gas from the gas turbine to heat water and generate steam, the duct burner system can comprise a source of hydrogen fuel and a fuel distribution manifold located in the steam generator to distribute the hydrogen fuel across a length of a duct of the steam generator.

In another example, a method for heating exhaust gas in a heat recovery steam generator for use in a combined-cycle power plant can comprise directing combustion gas of a gas turbine engine into a duct, introducing hydrogen fuel into the duct, combusting the hydrogen fuel and the combustion gas in the duct to generate heated gas, and heating water pipes in the duct with the heated gas to generate steam.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
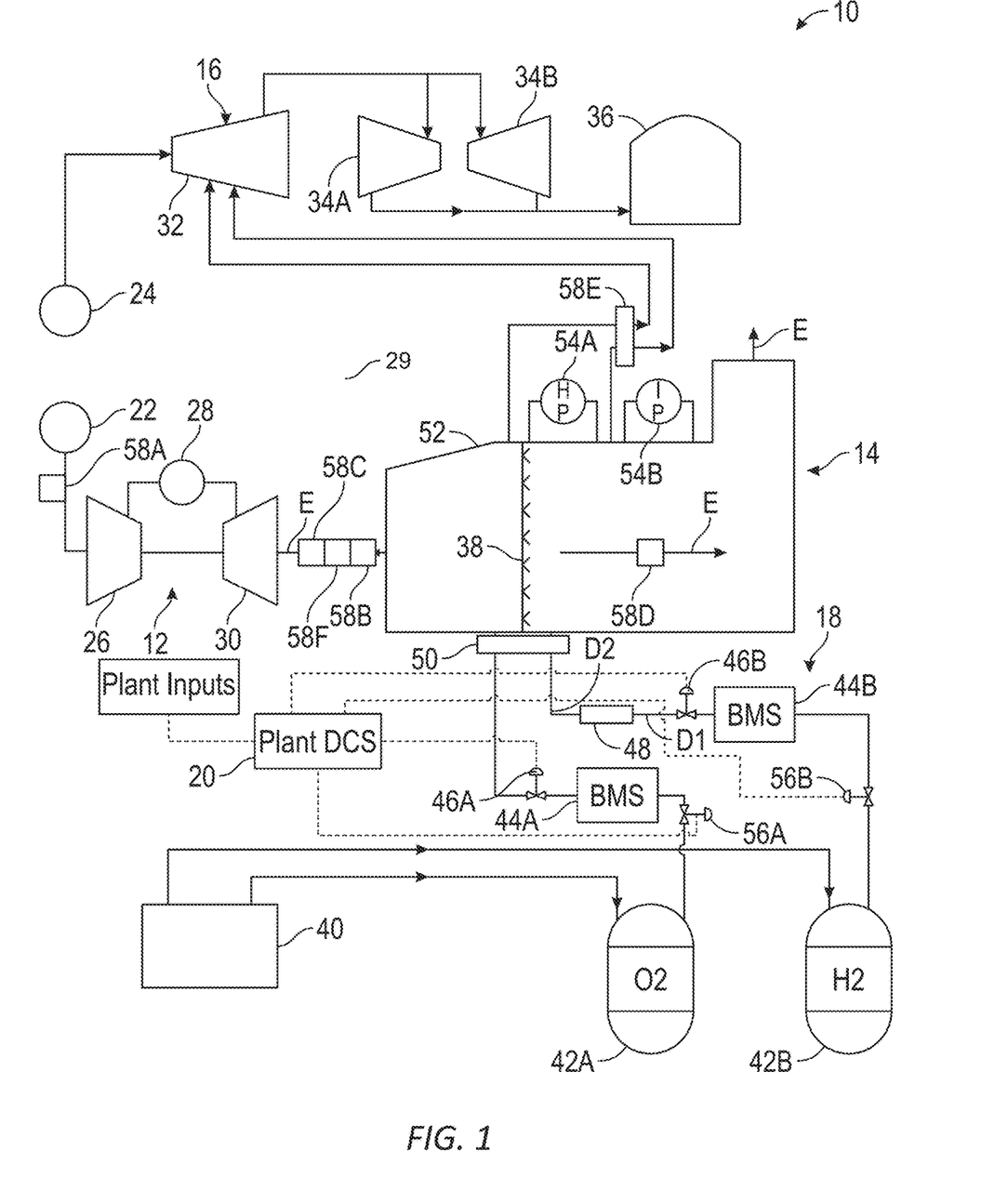
FIG. 1 is a schematic view of a gas turbine combined-cycle power plant including a supplemental firing unit including sources of hydrogen fuel and oxygen.

FIG. 1 is a schematic diagram of combined-cycle power plant 10 comprising gas turbine 12, heat recovery steam generator (HRSG) 14, steam turbine 16, supplemental firing system 18, and plant controller 20. Gas turbine 12 can be configured to provide input to electrical generator 22 and steam turbine can be configured to provide input to electrical generator 24. Controller 20 can comprise a Distributed Control Systems (DCS) device. HRSG 14 can be operatively coupled to steam turbine 16. Gas turbine 12 can include compressor 26, combustor 28 and turbine 30. Steam turbine 16 can include multiple stages, such as high pressure turbine 32 and intermediate/low pressure turbines 34A and 34B. Steam turbine 16 can additionally be coupled to condenser 36. Supplemental firing system 18 can comprise duct burner system 38, gas generator 40, storage tanks 42A and 42B, control devices 44A and 44B, valves 46A and 46B, expansion device 48 and an optional mixer 50.

Gas turbine 12 can be configured to operate by compressing air in compressor 26, mixing the compressed air with fuel in combustor 28 to generate high energy gases via burning of the fuel, and then expanding the high energy gases in turbine 30 to produce rotational shaft power. Rotation of turbine 30 can rotate a shaft to propagate rotation of compressor 26 and compression of air therein to maintain the combustion process. That same rotational shaft power can be used to turn a generator shaft to provide input to electric generator 22. Thus, combustion of fuel in combustor 28 is converted to electricity at electric generator 22. In examples, combustor 28 can be connected to fuel source 29, which, in examples, can comprise a source of natural gas.

Gas expanded by turbine 30 can be passed into HRSG 14 to, for example, generate steam for operation of steam turbine 16. HRSG 14 can include duct burner system 38, as well as other components such as a superheater, an evaporator, an economizer and a selective catalytic reduction (SCR) system, which are not shown in FIG. 1 for simplicity. Exhaust gas E from turbine 30 can pass by various heat transfer components, of HRSG 14 to produce steam and ultimately cause rotation of turbines 32, 34A and 34B to rotate a steam turbine shaft that provides input to electrical generator 24. Condenser 36 can collect steam from steam turbine 16 and return water condensed therein to HRSG 14 to propagate the steam generation process. Steam turbine 16 and condenser 36 can operate in a conventional manner. Thus, generation of heat from exhaust gas of gas turbine 12 can be converted to electricity at electric generator 24. Electricity generated by electrical generators 22 and 24 can be delivered to end users such as by coupling to a distributed grid network.

In order to increase the output capacity of HRSG 14, e.g., the ability to turn water into steam, the temperature of exhaust gas E of gas turbine 12 can be increased using duct burner system 38. Duct burner system 38 can introduce a fuel into duct 52 of HRSG 14 before (e.g., upstream of) water piping of high pressure and low pressure steam circuits 54A and 54B. The fuel can mix with the exhaust gas. Duct burner system 38 can include one or more ignitors (e.g., ignitors 68A-68C of FIG. 2) to cause the fuel to burn to increase the temperature of exhaust gas E.

In the present disclosure, duct burner system 38 can utilize hydrogen with oxygen as an augmenting oxidant to combust and provide supplemental heat to the overall thermal cycle. The oxygen and hydrogen ratio can be independent from the operating profile of gas turbine 12. As such, duct burner system 38 can provide an expanded operating profile, improved duct burner flame stability, improved overall thermal efficiency, lower emissions, and enhanced load following capabilities to combined-cycle power plant 10. The gas products for the supplemental firing, e.g., $H_2$ and $O_2$, can be produced by electrolyser 40 or can be provided from independent sources. In an example, electrolyser 40 can provide $H_2$ and oxygen can be utilized from ambient air. In such configurations, ambient air provides nitrogen to the combustion process, which can result in the production of unwanted emissions. Such emissions can be remedied with the use of selective catalytic reduction (SCR) systems. In the illustrated embodiment, electrolyser 40 can provide both $H_2$ and $O_2$.

Electrolyser 40 generates $H_2$ and $O_2$ gas using an electric current. For example, water ($H_2O$) can be decomposed into oxygen ($O_2$) and hydrogen ($H_2$). The resulting constituents of the electrolysis process, e.g., $O_2$ and $H_2$, can be stored in tanks 42A and 42B, respectively. The $O_2$ and $H_2$, can be pressurized within tanks 42A and 42B. The pressurization can occur as a result of the electrolysis process or can be provided by additional means, such as one or more compressors or pumps.

Each of tanks 42A and 42B can provide a gas such as $H_2$ or $O_2$ to duct burner system 38. Flow of the gas can be controlled by control devices 44A and 44B in conjunction with modulating valves 46A and 46B. Furthermore, tanks 42A and 42B can be provided with shut-off valves 56A and 56B. Shut-off valves 56A and 56B can comprise on/off valves that permit or obstruct flow of gas from tanks 42A and 42B, respectively. Valves 46A and 46B can comprise modulating valves that can be moved into a plurality of positions between on and off to allow different amounts of gas to flow therethrough, respectively. Modulating valves 46A and 46B and shut-off valves 56A and 56B can be connected to plant controller 20.

Duct burner system 38 can be configured to combust the combustion constituents ($H_2$ and $O_2$) added to exhaust gas E provided to duct 52 from gas generator 40 and/or tanks 42A and 42B. As such, in the configuration of FIG. 1, an augmenting oxidant, oxygen ($O_2$), can be introduced into duct 52 to support the burning of a fuel, hydrogen ($H_2$), also introduced into duct 52.

Fuel and oxidant distribution and flame stability can be supported over a wide range of operating conditions, such as by modulation of valves 46A and 46B through BMS 44A and 44B, respectively. Operation of a standard duct burner using natural gas is limited by parameters of the gas turbine exhaust, such as exhaust gas temperature, oxygen level, and flow rate. With supplemental firing system 18 of the present disclosure, a separate supply of $O_2$ can enable combustion of $H_2$ in duct 52 with operation over a wider range of gas turbine exhaust parameters, at least somewhat decoupled from the exhaust and operation parameters of gas turbine 12.

The flow of $H_2$ from tank 42B via valve 46B to duct burner 38 can be controlled by a hydrogen flow controller incorporated into BMS 44B and in communication with plant controller 20. BMS 44B can modulate the hydrogen flow rate based on sensor signals from GT load sensor 58A, and GT exhaust flow rate sensor 58B, GT exhaust temperature sensors 58C and 58D upstream and downstream of duct burner 38, HRSG steam temperature sensor 58E, oxygen level sensor 58F, as well as the desired total power output of GTCC power plant 10 including the energy input from hydrogen-fueled duct burner 38. For example, because combustion of $H_2/O_2$ is faster and hotter than natural gas, the amount of $H_2/O_2$ to be combusted can be based upon the exhaust flow rate as well as HRSG steam temperature limitations.

The flow of $O_2$ from tank 42A via valve 46A to duct burner 38 can be controlled by an oxygen flow controller incorporated into BMS 44A and in communication with plant controller 20. BMS 44A can control the oxygen flow rate based on the supplemental firing load of the hydrogen and also the flow rate and oxygen content of the incoming GT exhaust E to duct burner 38 as well as the exhaust gas temperature both upstream and downstream of duct burner 38. A target combined oxygen content (from the exhaust gas and external supply) of about 10% to about 20% excess oxygen is expected to provide complete combustion. Oxygen sensors can be provided in duct 52 to sense the amount of oxygen in exhaust gas E upstream of duct burner system 38.

The hydrogen and oxygen can be supplied from tanks 42A and 42B via separate pipes all the way to the inside of duct 52 of HRSG 14, to prevent flame flashback in the supply pipes, as described with reference to FIG. 2 for example. Alternatively, the oxygen and hydrogen can be pre-mixed locally, such as within mixer 50, and the mixture can be injected into the exhaust stream immediately prior to ignition.

The configuration of FIG. 1, as well as other hydrogen-combusting duct burners, can be enhanced with other optional devices and configurations that can add value and efficiency to the combustion process to, among other things reduce emissions. First, fuel pre-heat can increase flame stability, reduce CO, and allow increased flame management to improve NOx control. Because Hydrogen (above 200° K) has a negative Joule-Thomson coefficient, expansion device 48 can be installed after both hydrogen Burner Management System (BMS) 44B and hydrogen flow controller (e.g. valve 46B) to provide fuel pre-heat. Expansion device 48 can comprise any throttling device design that can provide fuel pre-heat to help reduce CO, and enhance flame stability and NOx control. Because the operating temperature of the hydrogen will always be above 200° K, the joule-Thompson coefficient will always remain negative. The pipe diameter of post-expansion (D2) versus pre-expansion (D1) can also be dictated by cycle design specifics but it is always expected that D2 will be greater than D1, to accommodate (and potentially maximize) the expansion. Alternatively, or in addition to, expansion device 48, nozzles can be installed on the duct burner lines, and utilized to further expand the hydrogen beyond what the upstream expansion device 48 achieves, to obtain further fuel pre-heat, as is illustrated in FIG. 2. Use of nozzles on the duct burner lines can allow for a reduction of the post-expansion pipe diameter (D2) at the upstream expansion device, which may reduce material cost and complexity. In other examples, fuel heating devices, such as electric heaters or heat exchangers in communication with other portions of GTCC power plant 10 can be used.

The separately controlled and consistent flows of hydrogen and oxygen can help ensure optimal combustion conditions to maintain flame stability and minimize CO and NO emissions over a wide range of GT operating conditions. The optional components (throttling device, duct burner nozzles) further enhance the operation of the system.

Figure 2:
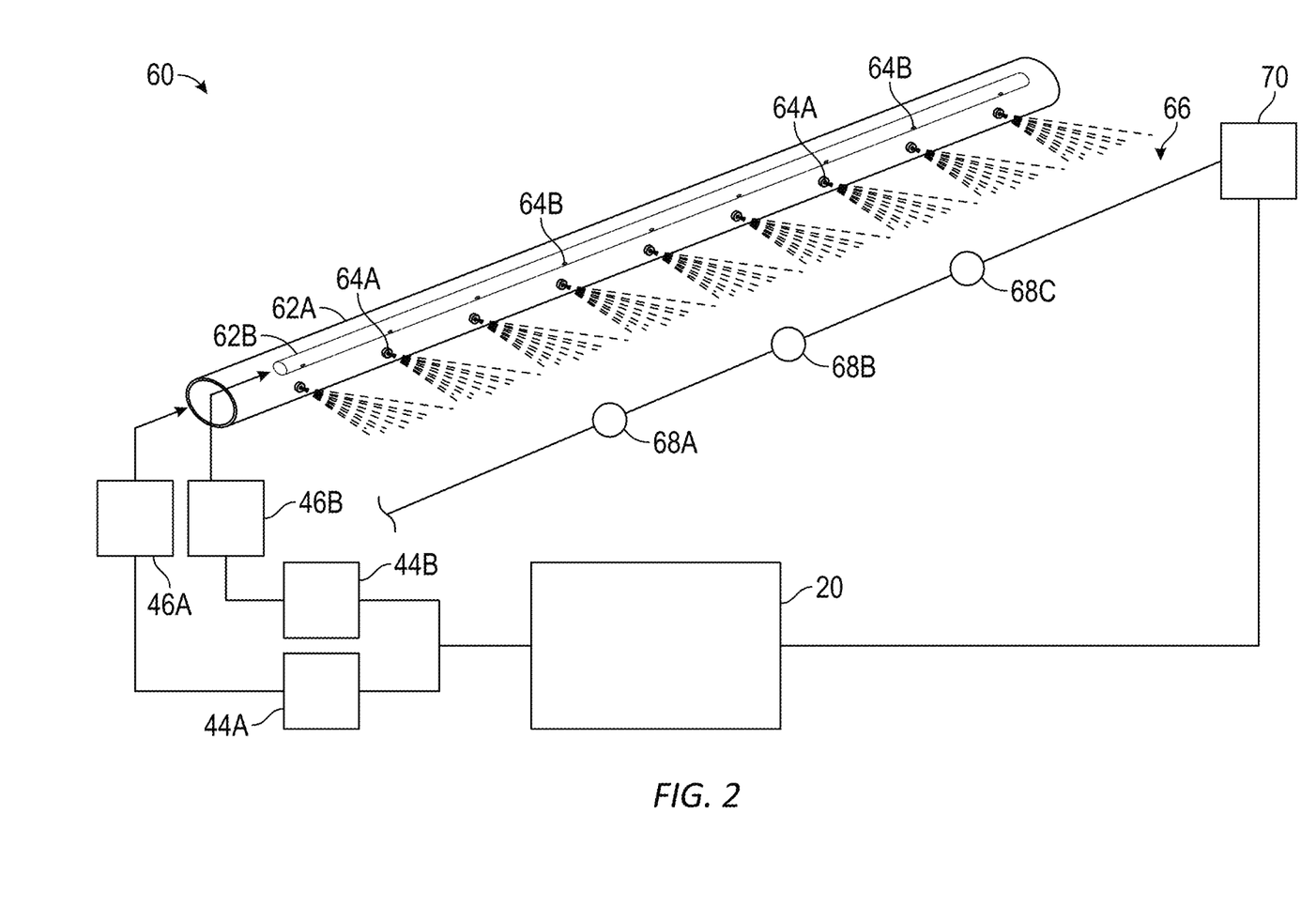
FIG. 2 is a perspective view of a distribution system including separate manifolds for introducing hydrogen fuel and oxygen into a duct of a HRSG of the gas turbine combined-cycle power plant of FIG. 1.

FIG. 2 is a perspective view of distribution system 60 for duct burner system 38 including separate manifolds 62A and 62B for introducing oxygen and hydrogen fuel into duct 52 of HRSG 14 of gas turbine combined-cycle power plant 10 of FIG. 1. Manifolds 62A and 62B can provide an alternative to mixer 50. As mentioned, mixer 50 can be used for premixing oxygen and hydrogen before ignition, which is one way to design a burner ("premixed flame"). In such a configuration, a single manifold can be used to introduce the mixture of oxygen and hydrogen into duct 52. Alternatively, manifolds 62A and 62B can be used to keep oxygen and hydrogen separate until just before ignition (so called "diffusion flame"). Duct burner system 38 can be configured either way.

Flow of gas into manifolds 62A and 62B can be controlled by modulating valves 46A and 46B, which are operated by control devices 44A and 44B, respectively, in coordination with controller 20. Motive pressure to the oxygen and hydrogen introduced into manifolds 46A and 46B can be provided by compressors or pumps, electrolyser 40, or by pressurization of tanks 42A and 42B.

Manifolds 62A and 62B can be configured as elongate tubular elements that can extend partially or fully across duct 52, e.g., into the plane of FIG. 1. Multiple longitudinal levels of manifolds 62A and 62B can be vertically provided within duct 52 to distribute the oxygen and hydrogen across the height of duct 52. Manifolds 62A and 62B can be provided with orifices 64A and 64B, respectively, to permit gas to flow out of the elongate tubular elements. Orifices 64A and 64B can be provided on downstream or trailing sides of manifolds 62A and 62B, respectively. Ignition system 66 can be provided downstream of manifolds 62A and 62B to provide one or more sparks or other flame-instigators using ignitors 68A, 68B and 68C. Excitor 70 can be coupled to controller 20 to provide energy to ignitors 68A-68C, such as heat or electricity.

In the illustrated example, the diameter of manifold 62A is shown to be greater than the diameter of manifold 62B. However, the absolute and relative diameters, or cross-sectional areas for other shapes, for manifolds 62A and 62B, as well as the sizes of orifices 64A and 64B, can be determined based on the expected operating range of temperature and volume of exhaust gas E as well as Hydrogen and Oxygen. Orifices 64A and 64B can comprise simple through-bores in manifolds 62A and 62B. However, in other examples, orifices 64A and 64B can be configured as or equipped with nozzles, as is shown in FIG. 3.

Figure 3:
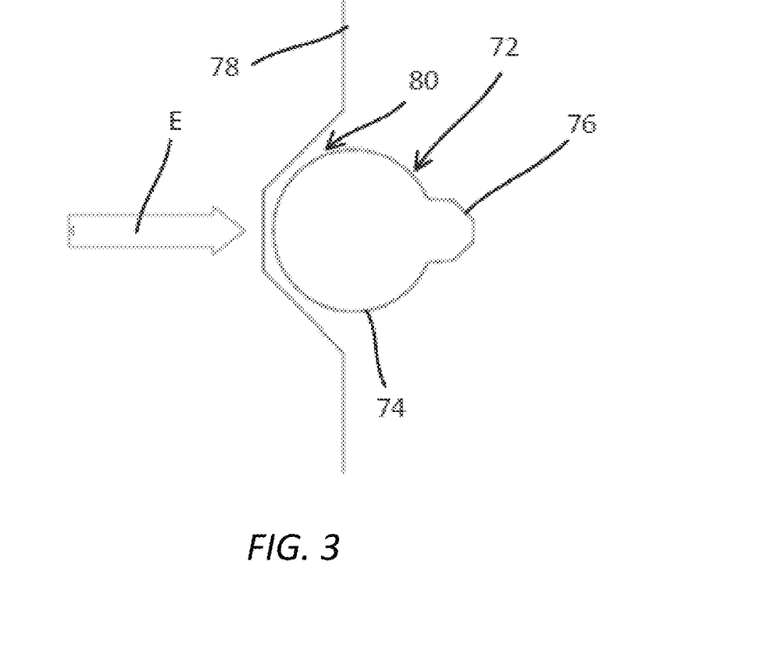
FIG. 3 is a schematic cross-sectional view of a hydrogen manifold incorporating a nozzle.

FIG. 3 is a schematic cross-sectional view of manifold 72 comprising tubular body 74, nozzle 76 and deflector 78. Deflector 78 can be contoured to form pocket 80 in which tubular body 74 can be fully or partially disposed. Deflector 78 can extend fully or partially across the width of duct 52 a length sufficient to shield the width of manifold 72.

Manifold 72 can comprise elongate tubular body 74 having a length configured to span, or at least partially span, the width of duct 52. Manifold 72 can have a partially circular cross-sectional profile, but can have other shapes. Nozzle 76 can project from tubular body 74, such as in a radial direction from the center of manifold 72. Manifold 72 can be positioned within duct 52 such that nozzle 76 projects in a downstream direction, e.g., in a flow direction of exhaust gas E. Nozzle 76 can be configured as a narrowing passage, e.g., a converging nozzle, to throttle the exit of the $H_2$ gas from manifold 72 and thereby provide pre-heating to the $H_2$ gas. However, nozzle 76 can have other configurations, such as converging-diverging. Nozzle 76 can be an alternative to expansion device 48 or can be provided in combination with expansion device 48 to provide two-stage heating.

Baffle 78 can be provided to slow down or diffuse the flow of exhaust gas E around manifold 72. Baffle 78 can be provided with perforations to allow exhaust gas E to pass through baffle 78. As such, exhaust gas E passing through and around baffle 78 can be slowed to a velocity more suited for receiving the $H_2$ gas from manifold 72 and sustaining the combustion process, e.g., promoting flame stability.

Figure 4:
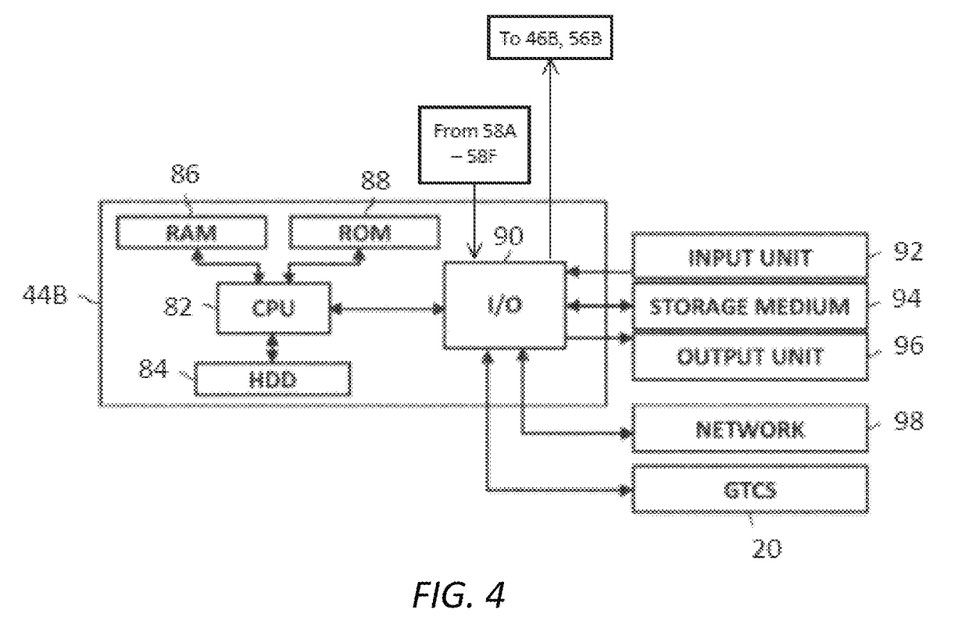
FIG. 4 is a schematic block diagram of a burner management system for use in the gas turbine combined-cycle power plant of FIG. 1.

FIG. 4 is a schematic block diagram of control device 44B comprising a burner management system for duct burner system 38. Control device 44B of FIG. 4 can be, for example, a computer that is installed in a control room for combined-cycle power plant 10, and has a function to control valves 46B and 56B. Control device 44B of FIG. 1 can be, for example, a computer that is installed in a control room for combined-cycle power plant 10, and has a function to control valves 46A and 56A. FIG. 4 is described with reference to control device 44B, though control device 44A can be configured similarly. Controller 20 (FIG. 1) can be in communication with control devices 44A and 44B and can be configured to control and coordinate operation of gas turbine 12, HRSG 14, and duct burner system 38. Control device 44B can comprise CPU 82, HDD 84, RAM 86, ROM (for example, EPROM) 88, and I/O port 90.

Input unit 92, recording medium 94, output unit 96, network 98, can be connected to I/O port 90 as appropriate, as well as a section of GTCC power plant 10 to be commanded. The sections to be commanded can include modulation valve 46B and shut-off valve 56B. Operation of duct burner system 38, including ignitors 68A-68C and excitor 70, can be controlled by controller 20, which can additionally control other aspects of GTCC power plant 10 such as fuel flow to gas turbine 12, inlet guide vanes (not depicted), operation of generators 22 and 24, steam turbine 16, gas generator 40 and others. As such, operation of GTCC power plant 10 including supplemental firing system 18 can be controlled by controller 20 in combination with control devices 44A and 44B.

Input unit 92 can comprise a keyboard, a mouse, a touch panel, and the like can be typically used. Output unit 92 can comprise a touch panel, and can additionally function as input unit 92. Recording medium 94 can comprise any of various kinds of recording mediums such as a magnetic tape, a magnetic disk, an optical disk, a magneto-optical disk, and a semiconductor memory is applicable. Output unit 96 can comprise a display device such as a monitor or a printer is applicable. A device such as a loudspeaker that outputs sound is applicable as output unit 96. In addition, control device 44B can be configured integrally with input unit 92 and output unit 96, and a form of control device 44B is not limited but can be a desktop type, a notebook type, a tablet type, or the like. Network 98 includes not only the Internet but also a LAN and the like, and control device 44B can be connectable to another terminal, a database, a server, controller 20, control device 44A or the like via network 98.

Various kinds of programs including a GTCC operation program and the like are stored in ROM 88, and these programs are read by CPU 82 from ROM 88, loaded to, for example, RAM 86, and executed. The operation program can be input from recording medium 94 or network 98 via I/O port 90 and stored in ROM 88. The operation program can be executed by being read by CPU 82 from recording medium 94 or network 98 via the I/O port 90 and directly loaded to RAM 86 without being stored in ROM 88. Data and the like obtained by operations are stored in one or more memories out of HDD 84, ROM 88, RAM 86, and recording medium 94, and output to output unit 96 by operating input unit 92. In the present specification, at least one of RAM 86, ROM 88, HDD 84, recording medium 94, a storage device connected via the network 98, and the like will be denoted simply as "memory," hereinafter.

Instructions for operating supplemental firing system 18, duct burner system 38 and gas generator 40 can be stored in ROM 88. Such instructions can include commands for opening and closing shut-off valve 56B when supplemental firing system 18 comes on-line or goes off-line and commands for modulating valve 46B to control the combustion process generated by duct burner system 38. For example, the instructions can be configured to generate command signals for modulating valve 46B based on input signals received from GT load sensor 58A, GT exhaust flow rate sensor 58B, GT exhaust temperature sensors 58C and 58D, HRSG steam temperature sensor 58E and oxygen level sensor 58F received by I/O port 90. Likewise, the instructions can be configured to generate command signals for modulating valve 46B based on output of oxygen being introduced into duct 52 by control device 44A.

In additional examples, control device 44B can be configured to operate gas generator 40, such as to ensure that an adequate supply of hydrogen has H2 can be supplied to duct burner system 38 for expected or forecast operation of GTCC power plant 10. In an example, control device 44B can operate gas generator 40 in real-time with operation of supplemental firing system 18 to provide a live supply of hydrogen gas while supplemental firing system 18 is operating. In other examples, control device 44B can operate gas generator 40 intermittently to fill tank 42B and as duct burner system 38 draws hydrogen gas from tank 42B, such as below a threshold level, control device 44B can initiate operation of gas generator 40 to fill tank 42B.

Figure 5:
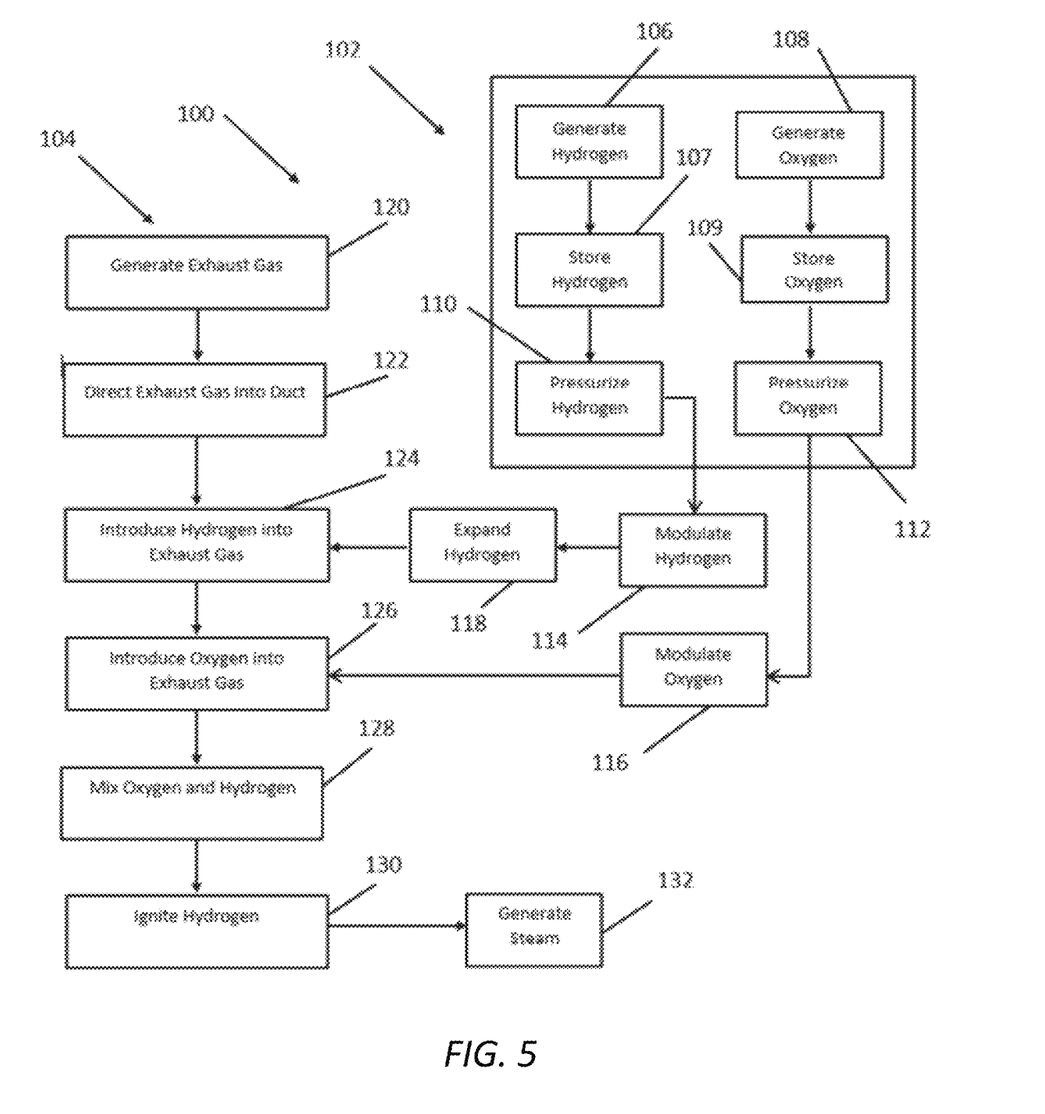
FIG. 5 is a schematic line diagram illustrating methods of generating and combusting hydrogen fuel and oxygen in a duct burner of a combined-cycle power generation system.

FIG. 5 is a schematic line diagram illustrating methods of generating and combusting hydrogen fuel and oxygen in a duct burner of a combined-cycle power generation system. In an example, method 100 describes a method for operating duct burner system 38 and gas generator 40 of supplemental firing system 18 for heat recovery steam generator 14 according the present disclosure.

At step 102, gas generator 40 can be operated to generate $O_2$ and $H_2$ gas. For example, gas generator 40 can receive instructions from one or more of control device 44A, control device 44B and controller 20 to initiate, sustain and cease generation of $O_2$ and $H_2$ gas.

At step 104, gas generated by gas generator 40 at step 102 can be introduced into duct burner system 38 to provide low-emission or no-emission heat to exhaust gas E.

At step 106, $H_2$ can be generated. In an example, gas generator 40 can comprise an electrolyser that generates $H_2$ gas.

At step 107, the $H_2$ gas can be stored for use, either immediately or subsequently. In an example the $H_2$ gas can be stored in tank 42B. Tank 42B can act as an accumulator for storing of the $H_2$ gas when gas generator 40 is not operating.

At step 108, $O_2$ can be generated. In an example, gas generator 40 can comprise an electrolyser that generates $O_2$ gas. In another example, oxygen from atmospheric or ambient air can be used as a source of $O_2$ gas.

At step 109, the $O_2$ gas can be stored for use, either immediately or subsequently. In an example the $O_2$ gas can be stored in tank 42A. Tank 42A can act as an accumulator for storing of the $O_2$ gas when gas generator 40 is not operating.

At step 110, the $H_2$ gas can be pressurized. In an example, the $H_2$ gas can be inherently pressurized as a result of the generation process at step 106. In examples of gas generator 40 comprising an electrolyser, the $H_2$ gas can be inherently pressurized. In other examples, the $H_2$ gas produced at step 106 can be subsequently pressurized with another device, such as a pump or compressor. In yet other examples, pressurized $H_2$ gas can be delivered in tank 42B to the site of combined-cycle power plant 10.

At step 112, the $O_2$ gas can be pressurized. In an example, the $O_2$ gas can be inherently pressurized as a result of the generation process at step 108. In examples of gas generator 40 comprising an electrolyser, the $O_2$ gas can be inherently pressurized. In other examples, the $O_2$ gas produced at step 108 can be subsequently pressurized with another device, such as a pump or compressor. In yet other examples, pressurized $O_2$ gas can be delivered in tank 42A to the site of combined-cycle power plant 10.

As indicated, although steps 106, 108, 110 and 112 are indicated as separate steps, in examples, steps 106, 108, 110 and 112 can occur simultaneously with the operation of gas generator 40.

At step 114, flow of the $H_2$ gas can be modulated, such as by use of control device 44B, to control the combustion process in duct 52 based on, for example, load of gas turbine 12, flow rate of exhaust gas E, temperature of exhaust gas E and steam temperatures within HRSG 14, as can be sensed via GT load sensor 58A, and GT exhaust flow rate sensor 58B, GT exhaust temperature sensors 58C and 58D upstream and downstream of duct burner 38, HRSG steam temperature sensor 58E and oxygen level sensor 58F.

At step 116, flow of the $O_2$ gas can be modulated, such as by use of control device 44A, to control the combustion process in duct 52 based on, for example, load of gas turbine 12, flow rate of exhaust gas E, temperature of exhaust gas E, oxygen level of exhaust gas E, and steam temperatures within HRSG 14, as can be sensed via GT load sensor 58A, and GT exhaust flow rate sensor 58B, GT exhaust temperature sensors 58C and 58D upstream and downstream of duct burner 38, HRSG steam temperature sensor 58E and oxygen level sensor 58F.

At step 118, the $H_2$ gas can be throttled via use of an expansion device such as a nozzle. Throttling of the $H_2$ gas can add heat to the $H_2$ gas to further increase the efficiency of steam production in HRSG 14. For example, expansion device 48 can be utilized to throttle the $H_2$ gas before entering duct 52, after exiting valve 46B. In other examples, throttling of the $H_2$ gas can occur with nozzles, such as nozzle 76 of FIG. 3.

At step 120, gas turbine 12 can be operated to produce exhaust gas E. As described, a fuel such as natural gas can be delivered to combustor 28 and mixed with ambient air compressed by compressor 26. The high energy gas resulting from the combustion process can be used to turn turbine 30 and heat from exhaust gas E exiting therefrom can be used in an additional process to generate electricity with HRSG 14 and steam turbine 16.

At step 122, exhaust gas E can be directed into duct 52 of HRSG 14.

At step 124, the $H_2$ gas can be introduced into duct 52, such as by use of manifold 62B or manifold 72.

At step 126, the $O_2$ gas can be introduced into duct 52, such as by use of manifold 62A or manifold 72.

At step 128, the $H_2$ gas and the $O_2$ gas can be mixed, such as by using mixer 50. Step 128 can be optional. Step 128 can additionally occur before steps 124 and 126.

Mixed or independently introduced $H_2$ gas and $O_2$ gas can be distributed within duct 52 via manifolds 62A, 62B or 72 to allow for an even and sustainable combustion of $H_2$ within duct 52. Baffle 78 can further be utilized to stabilize the combustion process by slowing the flow of exhaust gas E at manifolds 62A, 62B or 72.

At step 130, the $H_2$ gas can be ignited to burn with the $O_2$ gas, thereby producing heat. For example, excitor 70 can be activated by controller 20 to operate ignitors 68A-68C, thereby causing a heat source to propagate combustion and flame within duct 52.

At step 132, heat from the combustion of the $H_2$ gas with the $O_2$ gas at step 130 can be used to generate steam, such as by heating water located in HRSG 14. Heating of exhaust gas E with the combustion of the $H_2$ gas can increase the ability of HRSG 14 to turn steam turbine 16 without producing harmful emissions.

The invention disclosed here enables the HRSG duct burner to efficiently combust hydrogen by implementing a hydrogen-fueled duct burner that utilizes oxygen as an augmenting oxidant. The implementation of the aforementioned devices, systems and methods can allow for either one or a combination of the following:

1. Improved overall thermal cycle efficiency;
2. Lower emissions; and
3. Improved duct burner operating range and the operating range and ramping capabilities of the combined-cycle power plant.

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of operating a combined-cycle power plant, the method comprising:
    supplying natural gas to a combustor of a gas turbine engine from a source of natural gas;
    conducting a combustion process of air and the natural gas in the combustor of the gas turbine engine to generate combustion gas;
    directing the combustion gas of the gas turbine engine into a duct of a steam generator;
    generating hydrogen fuel from water with an electrolyzer;
    introducing the hydrogen fuel into the duct via a fuel distribution manifold of a duct burner system, the fuel distribution manifold located in the steam generator to distribute at least a portion of the hydrogen gas within the duct of the steam generator, the fuel distribution manifold comprising a tubular body extending along an axis and having a discharge opening;
    combusting the hydrogen fuel and the combustion gas in the duct to generate heated gas;
    heating water pipes of the steam generator in the duct with the heated gas to generate steam;
    regulating flow of hydrogen gas, using a burner management system, from the electrolyzer to the fuel distribution manifold based on operating parameters of the duct burner system;
    controlling delivery of the natural gas, using a system controller, to the combustor from the source of natural gas; and
    coordinating operation of the steam generator and the burner management system, using the system controller, independent of controlling delivery of the natural gas to the combustor.

2. The method of claim 1, further comprising directing oxygen into the combustion gas using an oxygen distribution manifold.

3. The method of claim 1, further comprising introducing pure oxygen into the duct, wherein the hydrogen fuel is undiluted.

4. The method of claim 3, further comprising generating the pure oxygen with the electrolyzer.

5. The method of claim 4, further comprising storing the hydrogen fuel and the pure oxygen in storage tanks before directing the hydrogen fuel and the pure oxygen into the duct.

6. The method of claim 4, further comprising modulating flow of the hydrogen fuel and the pure oxygen to the duct based on performance of the gas turbine engine.

7. The method of claim 6, further comprising:
    sensing a flow rate of the combustion gas in the duct; and
    sensing an oxygen content of the combustion gas in the duct.

8. The method of claim 1, further comprising expanding the hydrogen fuel before introducing the hydrogen fuel into the duct.

9. The method of claim 1, further comprising generating electricity with the generated steam.

10. A combined-cycle power plant comprising:
    an electrolyzer configured to generate hydrogen gas from water;
    a source of natural gas;
    a gas turbine engine configured to generate exhaust gas and a steam generator configured to receive the exhaust gas from the gas turbine engine to heat water and generate steam, wherein the gas turbine engine comprises a combustor that is configured to receive natural gas from the source of natural gas;
    a duct burner system comprising:
        a fuel distribution manifold located in the steam generator to distribute at least a portion of the hydrogen gas within a duct of the steam generator;
        wherein the fuel distribution manifold comprises:
            a tubular body extending along an axis to receive hydrogen gas from the electrolyzer; and
            a discharge opening in the tubular body to release hydrogen gas into the duct;
    a burner management system to regulate flow of hydrogen gas from the electrolyzer to the fuel distribution manifold based on operating parameters of the duct burner system; and
    a system controller configured to control delivery of the natural gas from the source of natural gas to the combustor and to coordinate operation of the steam generator and the burner management system independent of controlling delivery of natural gas to the combustor of the gas turbine engine.

11. The combined-cycle power plant of claim 10, wherein the electrolyzer is further configured to produce oxygen gas from the water.

12. The combined-cycle power plant of claim 11, further comprising an oxygen distribution manifold located in the steam generator to distribute at least a portion of the oxygen gas within the duct of the steam generator, wherein the electrolyzer is configured to provide pure oxygen and undiluted hydrogen to the duct burner system.

13. The combined-cycle power plant of claim 11, wherein the burner management system is further configured to regulate flow of oxygen gas from the electrolysis system to the duct based on operating parameters of the duct burner system.

14. The combined-cycle power plant of claim 13, wherein the burner management system is communicatively coupled with modulating valves to control flow of the hydrogen gas to the fuel distribution manifold and control flow of oxygen gas to the duct.

15. The combined-cycle power plant of claim 13, further comprising:
 a flow rate sensor configured to sense flow rate of the exhaust gas in the duct; and
 an oxygen content sensor configured to sense oxygen content of the exhaust gas in the duct.

16. The combined-cycle power plant of claim 10, further comprising an expansion device configured to expand hydrogen gas before initiation of combustion of the hydrogen gas in the exhaust gas, wherein the expansion device comprises an expansion nozzle located between the electrolyzer and the steam generator or a nozzle located on the fuel distribution manifold.

17. The combined-cycle power plant of claim 10, further comprising a deflector positioned upstream of the tubular body to diffuse flow of exhaust gas around the tubular body, wherein the deflector comprises an elongate plate extending alongside the tubular body, the deflector having perforations to allow flow of exhaust gas therethrough.

18. The combined-cycle power plant of claim 17, wherein:
 the deflector comprises a pocket to receive the tubular body; and
 the discharge opening comprises a nozzle, wherein the nozzle comprises an elongate projection extending from the tubular body, the elongate projection forming a narrowing passage configured to throttle and preheat the hydrogen gas before discharge.

19. The combined-cycle power plant of claim 10, further comprising:
 an igniter configured to initiate combustion of the hydrogen gas in the exhaust gas within the duct;
 a first electric generator configured to be driven by the gas turbine engine to generate electricity;
 a steam turbine configured to receive steam generated by the steam generator; and
 a second electric generator configured to be driven by the steam turbine to generate electricity.

* * * * *